April 20, 1937. W. M. SCHWARTZ 2,078,165
COOKING APPARATUS
Filed June 19, 1936

Inventor:—
Walter M. Schwartz
by his Attorneys
Howson & Howson

Patented Apr. 20, 1937

2,078,165

UNITED STATES PATENT OFFICE 2,078,165

COOKING APPARATUS

Walter M. Schwartz, Philadelphia, Pa., assignor to Proctor & Schwartz, Incorporated, Philadelphia, Pa., a corporation of Pennsylvania Application June 19, 1936, Serial No. 86,185

7 Claims. (Cl. 53—1)

This invention relates to cooking apparatus and, more particularly, to cooking appliances, of the type employing a plurality or group of cooking receptacles.

One object of the invention is to provide in such an appliance novel means whereby the cooking receptacles may be handled vertically either individually or together as a unit, as desired, without regard to any particular sequence of individual handling and irrespective of horizontal movement of said receptacles.

Another and more specific object of the invention is to provide novel means in the form of cooperative handles on the said receptacles for the above-stated purpose, at least one of said receptacles having a stationary handle with recesses therein, and another of the receptacles having pivoted handles with portions adapted to enter the said recesses to secure the receptacles together for handling as a unit.

A further object of the invention is to provide a novel electrical cooking appliance comprising a vessel having electrical heating means associated therewith, and a plurality of cooking receptacles adapted for disposition within said vessel adjacent one another and provided with means of the character above stated whereby the receptacles may be vertically handled individually or together as a unit and irrespective of horizontal movement of said receptacles.

Other objects and features of the invention will appear hereinafter. The invention may be clearly understood by reference to the accompanying drawing, in which Fig. 1 is a sectional view of an electrical cooking appliance embodying the invention; and Fig. 2 is a perspective view of the associated cooking receptacles illustrating the novel feature of the invention.

Figure 1:
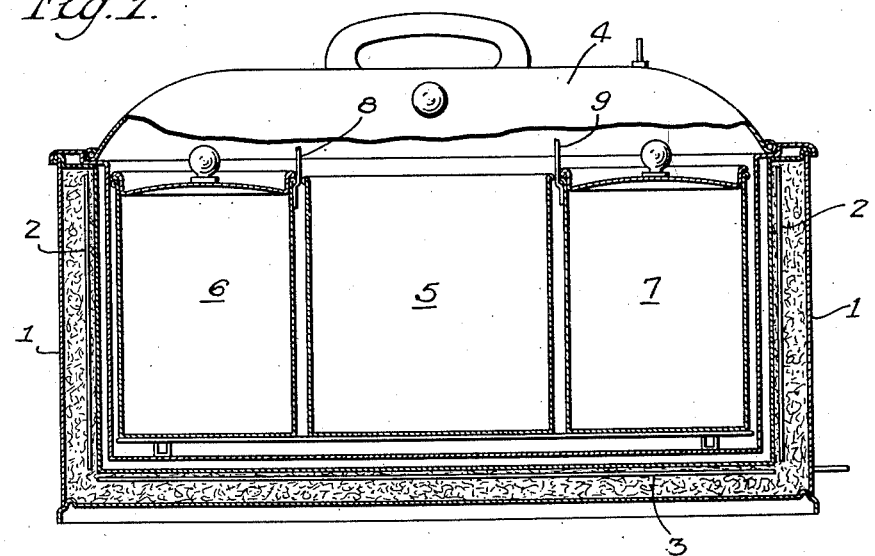

Referring to Fig. 1 of the drawing, there is illustrated an electrical cooking appliance of the type disclosed and claimed in the copending application of Joseph W. Myers, Serial No. 85,994, filed June 18, 1936. For the present purpose, it suffices to state that this appliance comprises a vessel 1 having electrical heating means 2 and 3 disposed within its side wall and bottom for the purpose of heating the interior area of the vessel. The vessel 1 is also provided with a lid 4. The specific details of the vessel 1, other than its adaptation to cooperate with the features hereinafter set forth, form no part of the present invention. In other words, it is within the purview of the present invention to provide a vessel of any particular type or construction, although the invention is particularly useful when employed in the cooking appliance of the said Myers application, as shown generally in Fig. 1.

A plurality of cooking receptacles are adapted for removable disposition within the vessel 1, as illustrated in Fig. 1. Preferably, there is provided a group of three such receptacles consisting of an inner vessel 5 and similar outer vessels 6 and 7 adapted for disposition on opposite sides of the inner receptacle 5. It will be understood, of course that these receptacles and the vessel 1 are so designed in relation to one another that the receptacles fit nicely within the vessel 1, as shown. As is now well understood in the art, the purpose of providing a plurality or group of cooking receptacles adapted for disposition within a relatively large vessel is to enable the cooking of several articles at the same time. For example, in the appliance illustrated, the inner or central cooking receptacle 5 may be employed to cook meat, while the outer receptacles 6 and 7 may be employed at the same time to cook different vegetables.

Figure 2:
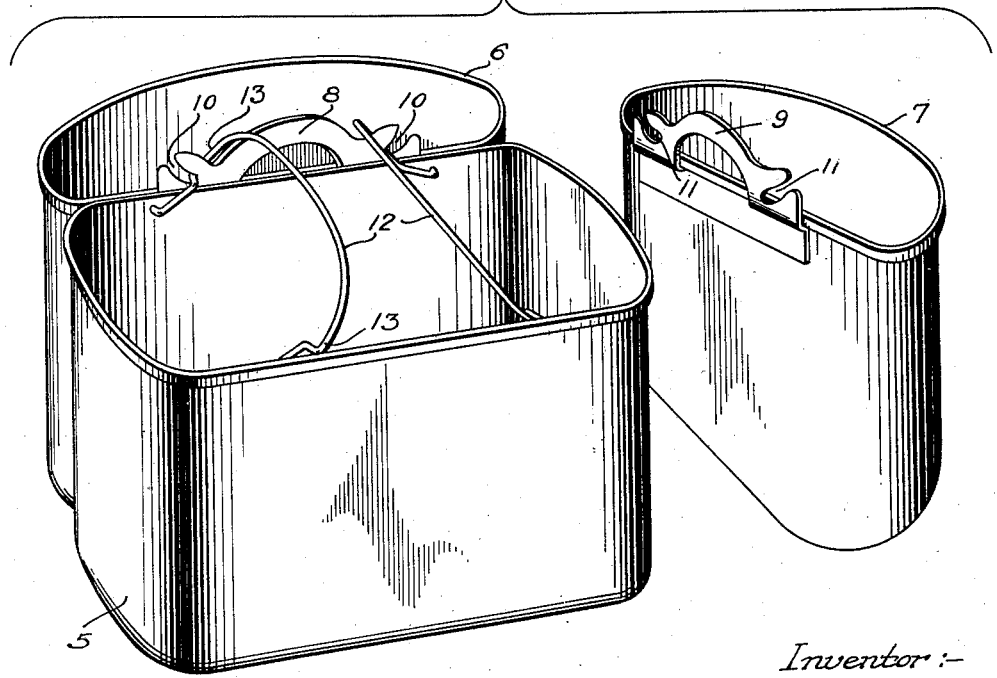

Referring now to Fig. 2, in accordance with the invention, there are provided on the cooking receptacles 6 and 7 at the sides thereof which are to be placed adjacent the receptacle 5, handles 8 and 9, respectively, having recesses 10 and 11 at the ends of the respective handles. There are also provided on the cooking receptacle 5 a pair of opposed pivoted handles 12 adapted to be disposed inwardly or outwardly and having offset portions 13 which are adapted to enter the recesses 10 and 11 of the handles 8 and 9 when the pivoted handles 12 are inwardly disposed, as shown in Fig. 2. For clarity of illustration, only one of the receptacles 6 and 7 is shown in cooperative relation with the receptacle 5 but it will be understood that both of the outer receptacles may be employed as shown in Fig. 1.

When the receptacles 5, 6, and 7 are cooperatively disposed, the pivoted handles 12 on the inner receptacle 5 may be positioned outwardly and, at such time, the receptacles 6 and 7 will be free of the inner receptacle 5 and may be handled individually by means of their handles 8 and 9, employing lifting devices in conjunction with the handles when desired or necessary. It will be seen that the handles 12 may be positioned vertically without engaging the handles 8 and 9, so that the receptacle 5 may be handled individually by means of its handles. It will be noted also that the receptacles may be handled in any desired sequence. When, however, the pivoted handles 12 on the inner receptacle are disposed inwardly, as shown in Fig. 2, with the outer receptacles adjacent the inner receptacle, the offset portions 13 of handles 12 enter the recesses 10 and 11 and thus secure the outer receptacles to the inner receptacle. All of the cooking receptacles may then be handled together as a unit by means of the inwardly disposed handles 12. In this manner, the receptacles may be inserted within or removed from the vessel 1 either individually in any desired sequence or together as a unit and without the necessity of moving the receptacles horizontally from their closely adjacent position.

It will be understood, of course, that the invention contemplates broadly the utilization of a plurality or group of cooking receptacles in cooperative association with one another and without reference to the support for such receptacles whether it be a relatively large vessel or some other supporting means. However, in its more limited and preferred aspect, the invention contemplates the cooperative employment of a group or plurality of such receptacles in conjunction with a cooking vessel.

Although the invention has been illustrated and described with particular reference to a preferred embodiment, it will be understood that other forms are possible and that various modifications may be resorted to within the scope of the appended claims.

I claim:

1. In apparatus of the class described, a plurality of cooking receptacles adapted for positioning adjacent one another, a stationary handle on one of said receptacles having recesses therein, and pivoted handles on another of said receptacles having portions movable into and out of said recesses to attach said first receptacle to or detach it from said second receptacle while the receptacles are adjacently disposed.

2. In apparatus of the class described, a group of three cooking receptacles, two of said receptacles being adapted for positioning on opposite sides of the third receptacle, stationary handles on the outer receptacles having recesses therein, and a pair of pivoted handles on the inner receptacle having offset portions movable into and out of said recesses to attach the outer receptacles to or detach them from the inner receptacle while the receptacles are adjacently disposed.

3. In apparatus of the class described, a group of three cooking receptacles, two of said receptacles being adapted for positioning on opposite sides of the third receptacle, stationary handles on the outer receptacles having recesses therein, and a pair of opposed pivoted handles on the inner receptacle adapted to be outwardly or inwardly disposed, said pivoted handles having offset portions adapted to enter said recesses when the pivoted handles are inwardly disposed to secure the outer receptacles to the inner receptacles.

4. In apparatus of the class described, a plurality of receptacles adapted for positioning adjacent one another, and interlockable means on said receptacles to enable handling of the receptacles vertically and either individually or simultaneously, said means comprising a stationary element on one of said receptacles and a movable element on an adjacent receptacle movable into and out of interlocking engagement with said stationary element irrespective of relative horizontal movement of said receptacles.

5. In apparatus of the class described, a plurality of receptacles adapted for positioning adjacent one another, and interlockable means on said receptacles to enable handling of the receptacles vertically and either individually or simultaneously, said means comprising a stationary handle on one of said receptacles and a movable handle on an adjacent receptacle movable into and out of interlocking engagement with said stationary handle irrespective of relative horizontal movement of said receptacles.

6. In apparatus of the class described, a plurality of receptacles adapted for positioning adjacent one another, and interlockable means on said receptacles to enable handling of the receptacles simultaneously, said means comprising a stationary element on one of said receptacles and a pair of opposed pivoted handles on an adjacent receptacle movable inwardly and outwardly into and out of interlocking engagement with said stationary element while said receptacles are adjacently disposed.

7. In apparatus of the class described, a plurality of receptacles adapted for positioning adjacent one another, and interlockable means on said receptacles to enable handling of the receptacles simultaneously, said means comprising a stationary recessed handle on one of said receptacles and a pair of opposed pivoted handles on an adjacent receptacle movable inwardly and outwardly into and out of interlocking engagement with said stationary handle while said receptacles are adjacently disposed.

WALTER M. SCHWARTZ.